United States Patent [19]
Haeseker et al.

[11] Patent Number: 6,103,180
[45] Date of Patent: *Aug. 15, 2000

[54] METHOD FOR PRODUCING A LOW ODOR, SOUND- AND HEAT-INSULATION SHAPED ELEMENT

[75] Inventors: Willy Haeseker, Bebra; Harald Freyer, Rotenburg an der Fulda, both of Germany

[73] Assignee: Matec Holding AG, Kuesnacht, Switzerland

[*] Notice: This patent issued on a continued prosecution application filed under 37 CFR 1.53(d), and is subject to the twenty year patent term provisions of 35 U.S.C. 154(a)(2).

[21] Appl. No.: 08/784,809

[22] Filed: Jan. 16, 1997

Related U.S. Application Data

[63] Continuation of application No. 08/311,769, Sep. 23, 1994, abandoned.

[30] Foreign Application Priority Data

Oct. 6, 1993 [CH] Switzerland ............................ 3007/93

[51] Int. Cl.⁷ .......................... B29C 35/04; B29C 43/04; B29C 70/42; B29C 70/46
[52] U.S. Cl. ...................... 264/546; 264/37.17; 264/119; 264/122; 264/257; 264/324; 264/347; 425/387.1; 425/405.1
[58] Field of Search .................................... 264/119, 122, 264/546, 324, 82, 510, 257, DIG. 75, 37.17, 37.14, 347; 425/387.1, 394, 405.1

[56] References Cited

U.S. PATENT DOCUMENTS

| | | |
|---|---|---|
| 2,557,071 | 6/1951 | Boehm ..................................... 154/133 |
| 3,280,237 | 10/1966 | Corbin ........................................ 18/17 |
| 3,627,608 | 12/1971 | Steiner .................................... 156/211 |
| 3,668,286 | 6/1972 | Brooks et al. ............................. 264/26 |
| 3,677,850 | 7/1972 | Holt et al. ............................... 156/62.2 |
| 3,686,383 | 8/1972 | Makinen ................................ 264/120 |
| 3,880,975 | 4/1975 | Lundmark ............................... 264/119 |
| 3,891,738 | 6/1975 | Shen ........................................ 264/101 |
| 4,082,886 | 4/1978 | Butterworth et al. .................. 428/284 |
| 4,107,379 | 8/1978 | Stofko .................................... 428/326 |
| 4,111,744 | 9/1978 | Reiniger ................................. 162/100 |
| 4,129,132 | 12/1978 | Butterworth et al. .................. 128/287 |
| 4,131,664 | 12/1978 | Flowers et al. .......................... 264/510 |
| 4,162,877 | 7/1979 | Nyberg ...................................... 425/84 |
| 4,183,997 | 1/1980 | Stofko .................................... 428/326 |
| 4,193,814 | 3/1980 | Shen ................................. 106/123 LC |
| 4,327,049 | 4/1982 | Miller . | |
| 4,357,194 | 11/1982 | Stofko .................................. 156/308.6 |
| 4,379,101 | 4/1983 | Smith ..................................... 264/40.3 |
| 4,392,861 | 7/1983 | Butterworth et al. .................. 604/366 |
| 4,425,126 | 1/1984 | Butterworth et al. .................. 604/366 |
| 4,462,785 | 7/1984 | Smith ................................... 425/387.1 |
| 4,469,655 | 9/1984 | Kiss .......................................... 264/82 |
| 4,590,114 | 5/1986 | Holtman ................................ 156/209 |
| 4,623,499 | 11/1986 | Fuma et al. . | |
| 4,786,351 | 11/1988 | Elliott et al. ............................. 156/245 |
| 4,795,517 | 1/1989 | Elliott et al. ............................. 156/221 |
| 5,028,286 | 7/1991 | Hsu ....................................... 156/62.4 |
| 5,108,691 | 4/1992 | Elliott . | |
| 5,401,448 | 3/1995 | Ricciardi et al. .......................... 264/37 |

Primary Examiner—Jan H. Silbaugh
Assistant Examiner—Michael I. Poe
Attorney, Agent, or Firm—Nath & Associates; Gary M. Nath; Gregory B. Kang

[57] ABSTRACT

A method for the production of a porous, sound- and heat-insulating shaped element, in particular for lining of sound- and/or heat-emitting vehicle components, by shaping and solidifying a bonded fiber fabric made of natural fibers mixed with a thermoplastic binder in a press mold. The binder is crosslinked uniformly in all regions of the porous shaped element to produce a shaped element featuring a formaldehyde emission of less than 2 ppm due to the replacement of conventional resins with the thermoplastic binder.

8 Claims, 1 Drawing Sheet

METHOD FOR PRODUCING A LOW ODOR, SOUND- AND HEAT-INSULATION SHAPED ELEMENT

This application is a Continuation of U.S. patent application Ser. No. 08/311,769, filed Sep. 23, 1994, now abandoned, the contents of which are incorporated herein in their entirety.

BACKGROUND OF THE INVENTION

The present invention pertains to a porous, sound- and/or heat-insulating shaped element, in particular for lining of sound- and/or heat-emitting vehicle components, comprising a bonded fiber fabric made of natural fibers mixed with a thermoplastic binder and shaped in a pressed mold and solidified, and a method for its production.

Shaped elements of this type are used preferably in the automobile industry where they are attached as insulating mats to the bottom of the chassis, to the front wall or in the engine compartment or trunk. For a tight fit these shaped elements are shaped according to the particular contours of the automobile in which they are to be used. Depending on their use, they can be provided with a cloth-like decor or a dirt-repellent protective coating.

In addition to the technical properties, such as acoustically active insulating ability and aesthetic aspects, today the health-related aspects of the shaped elements are moving into prominence. It is known that the release of substances from the shaped element produces not only unpleasant odors, but also can cause illness and allergic reactions. This applies specifically to bonded fiber fabric stiffened with phenolic resin.

In general these shaped elements are manufactured by hot pressing into suitable shaped bodies. In this case a so-called semifinished product—that is, a bonded fiber fabric of natural and/or synthetic fibers—is placed into a heatable mold with powdered binder, in particular phenolic resin, for example, Novolak, which polymerizes thermally at an appropriately high temperature, and is produced in the desired shape. The Novolak resin can be , but is not limited to, a phenol/formaldehyde or a urea/formaldehyde type resin.

A conventional method for the production of shaped elements from bonded fiber fabric is described e.g. in U.S. Pat. No. A 4,327,049. The formed fabric consists of a laminate of thermoplastic material, such as polystyrene or polyurethane foam and is placed into a heatable mold press, heated to soften it, and then pressed into shape. In this case it is difficult to achieve a homogeneous distribution of heat across the entire bonded fiber fabric and thus to obtain a shaped article with the same physical, in particular, acoustical insulating properties throughout—especially for shaped articles of more than 80 mm thickness. Moreover, at the elevated press temperatures, the risk of decomposition of the substances employed increases, and thus also the risk of release of undesirable decomposition products.

To avoid the disadvantage of poor heat transfer, in U.S. Pat No. 5,108,691 a High Caloric Transfer Medium (HCTM) process is proposed, where the bonded fiber fleece, e.g. resin-bonded glass fibers, is exposed to flowing, superheated steam, in addition to the heat treatment in the press mold. This steam penetrates through the formed fabric at a suitable temperature and thus allows an increase in shaping temperature in the interior of the mold.

However, it turns out that this method will work well only when using semifinished products with the same density at all points. Articles with differing densities however, will be exposed to the steam in differing degrees, so that it may happen that many sites will already be hardened, but others will still feature a high percentage of nonpolymerized material. Naturally this will again present the problem of release of substances hazardous to health, such as formaldehyde or ammonia.

An attempt has also been made (see U.S. Pat No. 4,623, 499) to pass a reaction gas through the closed press mold to effect the catalytic polymerization reaction. It turns out however, that this flow technique likewise is not able to produce an odor-free shaped article. In particular, areas of good and poor flow seem to appear in the shaped article. Likewise, differently pressed regions or regions with elevated water content appear to lead to locally greatly differentiated reaction initiation times. At any rate, shaped elements with a thickness greater than 30 mm cannot be satisfactorily hardened with this method and they exhibit burn phenomena at the access points of the flowing medium.

Another significant disadvantage of the method described above is that powdered binder present in the semifinished product is carried off by the flowing medium and this leads to local inhomogeneities in binder distribution. Moreover, resins blown off in this manner usually condense at the outlet openings of the press mold and require time-consuming manual maintenance and cleaning. However, the undesirably large quantities of toxic substances (formaldehyde, ammonia, phenol, etc.) released by incomplete crosslinking of the binder have proven to be particularly troublesome. Evidently those regions where insufficient heating is produced are particularly critical, so that the resin probably has released ammonia and formaldehyde, but the resin itself is not able to crosslink with the formaldehyde due to insufficient temperature levels.

In addition, the regions with insufficiently crosslinked binder are subject to rapid decomposition, and as a secondary effect to the unpleasant odor mentioned above, they will form potential foci for rot and mold.

Therefore it is an object of the present invention to create a shaped element which does not have the disadvantages of the known shaped elements and in particular, which features a low emission potential for toxic substances and unpleasant odors.

Possible approaches to achieving this object may be to extend the process time and/or to increase the process temperature. In this regard it must be remembered that the maximum permissible temperature is at around 180° C. to prevent carbonizing of the natural fibers. Therefore the percentage of binder has to be chosen so that a sufficient stability will be achieved in the poorly crosslinked regions of the shaped element. The relatively high percentage of noncrosslinked binders or cleavage products is to be taken into account here to ensure the necessary strength.

BRIEF DESCRIPTION OF THE INVENTION

However, according to the invention the particular problem is solved by making a shaped element whose binder is crosslinked uniformly in all regions of the porous shaped element and of course, preferably by the use of thermoplastic fibers or powder as binder. In particular this will create a shaped element that features a formaldehyde emission essentially of less than 2 ppm due to the replacement of conventional resins by thermoplastic fibers as binder.

In all prior products produced, uniform polymerization or crosslinking is not present and the shaped element has regions that are burned and/or not crosslinked at all, depending on the thickness and degree of deformation.

Therefore it is also an object of the present invention to create a method for producing a shaped element in which the bonding of thermoplastic fibers with the fibers of the bonded fabric is initiated as uniformly as possible and occurs at uniform speed at all locations and independently of the specific shaping and moisture content.

To achieve this object, in accordance with this invention a hot fluid is injected under increased pressure in a range of 2–20 bar, into a press mold which is sealed pressure-tight and contains the semifinished product, and for the duration of crosslinking between the thermoplastic fibers and the fibers of the bonded fabric, the fluid will continue to be held under this pressure, and before removing the produced shaped element from the opened press mold, the fluid is drained from the mold and sent to a filtration system.

In a preferred method for producing the shaped article from thermoplastic fibers and bonded fibers, a semifinished product comprising at least one layer is placed into an open heatable and coolable press mold the press mold is closed and sealed pressure-tight and pressurized if necessary. Through introduction of a high-energy compressed gas, preferably steam, into the mold cavity, ideal temperature and moisture conditions will be created for the bonding of the various fibers simultaneously in all regions of the shaped element. This compressed gas will produce an interior pressure of several bar inside the mold that will be maintained until the introduced thermoplastic fibers or powder elements are crosslinked with the bonded fiber fabric. In contrast to conventional methods, no fluid flow is created, but rather the pressure conditions remain stable during the production. Through the use of thermoplastic fibers instead of the usual phenol-Novolak powdered resins, the fraction of gaseous and toxic cleavage products during the hardening time is reduced to a minimum and the emission of formaldehyde, ammonia or phenols need not be feared from shaped elements produced in this manner. Furthermore, through the use of thermoplastic fibers of differing length or differing content, the mechanical properties of the shaped element can be varied within a broad range. Production of the shaped element under static pressure conditions is also lower in energy costs compared to conventional flow processes.

A heatable press mold suitable for implementation of the method comprises a first press mold section with steam feed lines. A second press mold section blocks the steam and makes a pressure-tight seal with the first mold section.

One sample embodiment of the invented shaped element and the preferred method for its production will be described below with reference to the FIGURE. We have:

BRIEF DESCRIPTION OF THE DRAWINGS

The FIGURE shows a shaped element produced according to this invention in a suitable press mold.

DESCRIPTION OF THE PREFERRED EMBODIMENT

Figure 1:
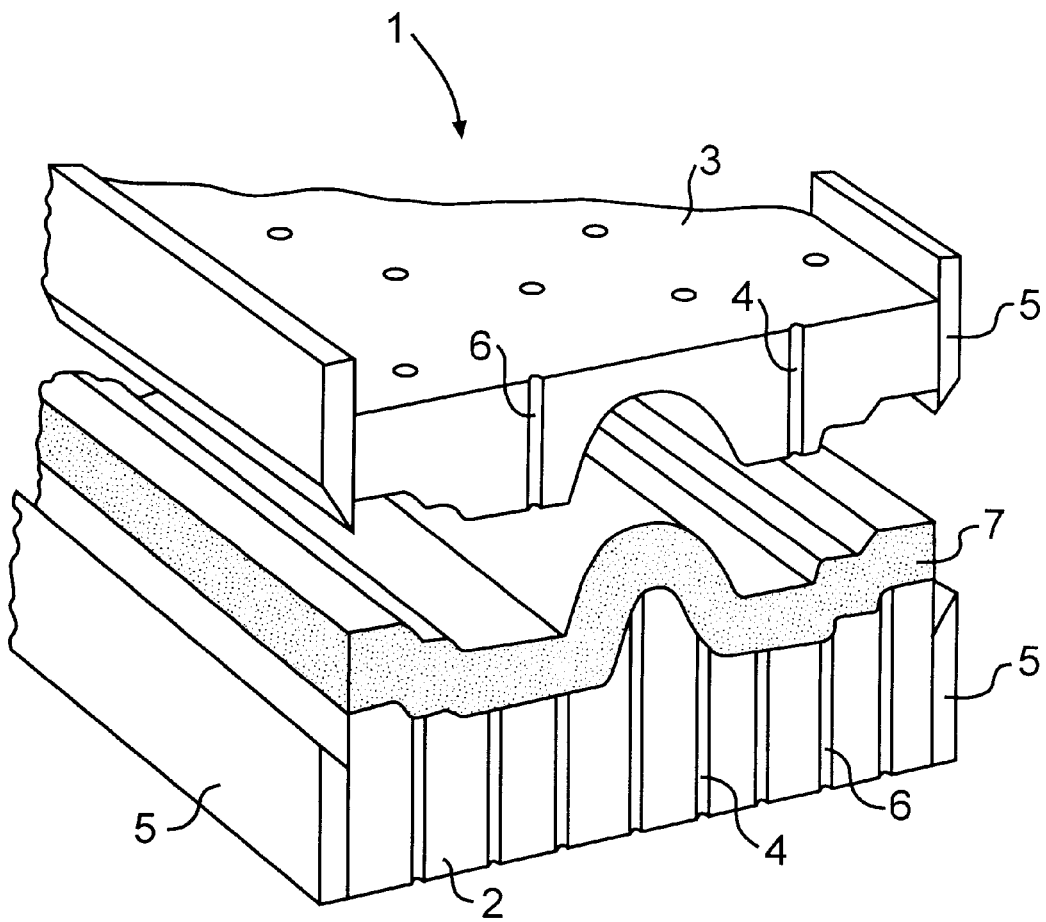

According to the FIGURE a press mold 1 comprises a lower mold half 2 and an upper mold half 3; these mold halves are heated with conventional means, not shown. These two mold halves together define a mold cavity in which the semifinished product will be pressed and hardened. A preferred semifinished product consists of a bonded fiber fleece of primarily natural fibers, e.g. reclaimed cotton fibers with other fillers in smaller quantities and is mixed with thermoplastic fibers. In the illustrated sample embodiment, the two halves of the mold have a number of tiny channels 4 through which the hot fluid will flow into the mold cavity. The illustrated press mold has cutting and sealing elements 5 at its edges; these can be moved and pushed independently, and they make a perimetral, pressure-tight sealing of the mold 1, i.e., through a labyrinth seal. After pressure-tight sealing of the press mold 1, the semifinished product is exposed to the hot fluid. Preferably the fluid is used as saturated, dry steam. This fluid has a static pressure of 2–20 bar, usually a pressure of 10 bar, and remains under this pressure in the mold cavity during the entire hardening time. The usual dwell time in the press mold amounts to as much as 60 sec. The dwell time, pressure and temperature are governed in this case by the desired mechanical properties of the shaped element. In this manner uniformly crosslinked shaped elements of over 80 mm thickness can be produced. Before opening the press mold, the compressed medium is released via closeable channels 6, for example. It is evident that these contaminated gases will be sent to a suitable purification system.

Suitable thermoplastic fibers consist preferably of polypropylene and have a length of about 4 cm. But in addition, thermoplastic copolymers or even bicomponent fibers known to the expert in the field can be used. The latter are fibers structured from two thermoplastic materials having different properties. For example, the core of the fiber can consist of a first thermoplastic material that is encased or coated by a second thermoplastic material in such a manner that the melting point of the second material is lower than that of the one used as core material. Likewise it is possible to form the two, elongated halves of the fiber from different thermoplastic materials.

The fraction of thermoplastic fiber or powder component of the total material should not be much below 20 wt % for the purpose under discussion, since otherwise only a few transitions will be present between thermoplastic fibers or powder grains and bonded fiber fleece, and bonding between the fibers is possible only at these few sites, and consequently the desired rigidity and strength cannot be obtained.

It turns out that for the shaped elements of the invention in comparison to conventional shaped elements with phenolic resins as binder, a significantly smaller fraction of thermoplastic fibers is needed to attain the same strength. In addition, these shaped elements with thermoplastic fibers have a smaller density, which in turn has a positive effect on their suitability as acoustic insulating articles. Acoustically useful densities lie in a range of about 50–200 g/cm$^3$, and the shaped articles produced by known methods have a density of more than 300 g/cm$^3$. They are then used normally as carriers for additional elements, but cannot be used as the acoustically active elements.

The herein described production method under stationary steam pressure conditions is suitable also in combination with powdered thermoplastics, since the temperature necessary to achieve the melting point or softening point of the thermoplastic material can be attained quickly and can be accurately adjusted. With this method it is also possible to produce shaped articles with a fluffy surface that will also have good acoustic properties. For production of fluffy products, the fibers are selected so that they are essentially resistant to the processing, that is, they do not melt entirely—bicomponent fibers are particularly well-suited for this—whereas for harder elements a preferably complete melting of the thermoplastic material is desirable.

It is also possible to employ a combination of thermoplastic fibers or powder with conventional resin binders. It can be used for example, in the production of fluffy products which often feature a low inherent strength due to their slightly melted fibers. The combination of duroplastic with thermoplastic binder produces, shaped articles with fluffy surface and sufficient rigidity, where the shaped articles then exhibit low emissions of toxic cleavage products in spite of the powder resins that are used. The gaseous cleavage products produced during manufacture cannot escape from the press mold sealed pressure-tight and thus take part in the polymerization during the entire crosslinking time. This in turn will reduce the resin fraction needed for polymerization, which in turn reduces the harmful emissions.

We claim:

1. A method for producing a porous, sound- and heat-insulating shaped element for lining sound-emitting vehicle components, heat-emitting vehicle components, or both sound-emitting and heat-emitting vehicle components, comprising:

placing a bonded fiber fabric of natural fibers and thermoplastic binders into a cavity of a heatable press mold, closing said press mold and sealing the cavity so that the cavity is sealed gas-tight and pressure tight, injecting saturated dry steam into the cavity containing the bonded fiber fabric with the binder, holding said injected saturated dry steam under a static pressure of 2–20 bar and maintaining said saturated dry steam in said press mold cavity whereby no fluid flow is created in said press mold, during an entire dwell time of the bonded fiber fabric and the binder in the press mold to thereby produce a shaped element, said binder being crosslinked uniformly in all regions of said shaped element draining the saturated dry steam from the cavity, opening the press mold, removing the shaped element from the press mold, and filtering the saturated dry steam from the cavity in a filtration system.

2. A method of producing a porous, sound- and heat-insulating shaped element for lining vehicle components as claimed in claim 1, wherein said binders are thermoplastic copolymers.

3. A method of producing a porous, sound- and heat-insulating shaped element for lining vehicle components as claimed in claim 1, wherein the fraction of thermoplastic binder is not much below 20 weight percent of the total material.

4. A method for producing a porous, sound- and heat-insulating shaped element for lining vehicle components as claimed in claim 1 wherein said thermoplastic binders are polypropylene.

5. A method of producing a porous, sound- and heat-insulating shaped element for lining vehicle components as claimed in claim 4 wherein said binders include thermoplastic fibers having a length of about 4 cm.

6. A method of producing a porous, sound- and heat-insulating shaped element for lining vehicle components as claimed in claim 1, wherein said binders are thermoplastic bicomponent fibers.

7. A method of producing a porous, sound- and heat-insulating shaped element for lining vehicle components as claimed in claim 6, wherein said fibers are a first thermoplastic material that is encased by a second thermoplastic material.

8. A method of producing a porous, sound- and heat-insulating shaped element for lining vehicle components as claimed in claim 7, wherein said second thermoplastic material has a melting point that is lower than that of the first thermoplastic material.

* * * * *